(12) United States Patent
Takeda

(10) Patent No.: US 10,482,730 B2
(45) Date of Patent: Nov. 19, 2019

(54) ELECTRONIC DEVICE

(71) Applicant: KYOCERA Corporation, Kyoto (JP)

(72) Inventor: Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/771,616

(22) PCT Filed: Nov. 9, 2016

(86) PCT No.: PCT/JP2016/083198
§ 371 (c)(1),
(2) Date: Apr. 27, 2018

(87) PCT Pub. No.: WO2017/086217
PCT Pub. Date: May 26, 2017

(65) Prior Publication Data
US 2018/0308325 A1    Oct. 25, 2018

(30) Foreign Application Priority Data

Nov. 17, 2015 (JP) ................. 2015-224962

(51) Int. Cl.
*G08B 6/00* (2006.01)
*G06F 3/01* (2006.01)

(52) U.S. Cl.
CPC ............... *G08B 6/00* (2013.01); *G06F 3/016* (2013.01)

(58) Field of Classification Search
None
See application file for complete search history.

(56) References Cited

U.S. PATENT DOCUMENTS

| 5,241,308 A * | 8/1993 | Young ................. G06F 3/0414 341/22 |
| 9,329,719 B2 * | 5/2016 | Molne ................. G06F 3/0414 |
| 9,984,479 B2 * | 5/2018 | Son ........................ G06F 3/016 |
| 10,139,976 B2 * | 11/2018 | Iuchi ..................... G06F 3/0414 |
| 2003/0184517 A1 | 10/2003 | Senzui et al. |
| 2003/0184526 A1 * | 10/2003 | Nakajima ............... G06F 3/045 345/173 |
| 2008/0030482 A1 * | 2/2008 | Elwell ................... G06F 3/0414 345/173 |
| 2008/0246741 A1 * | 10/2008 | Hinata ................... G06F 3/045 345/173 |
| 2008/0259048 A1 * | 10/2008 | Touyamasaki ....... G03G 15/5016 345/173 |
| 2009/0133499 A1 * | 5/2009 | Cato ........................ G01P 5/08 73/514.16 |
| 2010/0182255 A1 * | 7/2010 | Jeong .................... G06F 3/044 345/173 |
| 2012/0044618 A1 * | 2/2012 | Lee ........................ 361/679.01 |

(Continued)

FOREIGN PATENT DOCUMENTS

| JP | 2003-280807 A | 10/2003 |
| JP | 2010256460 A * | 11/2010 |

(Continued)

*Primary Examiner* — Chico A Foxx
(74) *Attorney, Agent, or Firm* — Studebaker & Brackett PC

(57) ABSTRACT

An electronic device includes a panel and a press detector configured to detect a press. The press detector detects the press on the basis of a force in a direction different from the press direction of the panel.

12 Claims, 15 Drawing Sheets

(56) References Cited

U.S. PATENT DOCUMENTS

| | | | | |
|---|---|---|---|---|
| 2012/0105358 A1* | 5/2012 | Momeyer | ............. | G06F 3/0414 345/174 |
| 2013/0332892 A1* | 12/2013 | Matsuki | ................ | G06F 3/0488 715/863 |
| 2013/0335375 A1 | 12/2013 | Nishikawa et al. | | |
| 2013/0342501 A1* | 12/2013 | Molne | .................. | G06F 3/0414 345/174 |
| 2014/0118270 A1 | 5/2014 | Moses et al. | | |
| 2015/0035759 A1* | 2/2015 | Harrison | ............... | G06F 3/0416 345/173 |
| 2016/0011708 A1* | 1/2016 | Chung | ................. | G06F 3/0414 345/174 |
| 2016/0259536 A1* | 9/2016 | Kudurshian | .......... | G06F 3/0486 |
| 2016/0274784 A1* | 9/2016 | Yui | ....................... | B25J 9/1658 |
| 2017/0336964 A1* | 11/2017 | Kim | ........................ | G06F 1/163 |
| 2018/0087984 A1* | 3/2018 | Hagelin | .................. | G01L 9/001 |

FOREIGN PATENT DOCUMENTS

| | | |
|---|---|---|
| JP | 4975722 B2 | 7/2012 |
| JP | 2012-242871 A | 12/2012 |
| WO | 2008/016614 A2 | 2/2008 |

\* cited by examiner

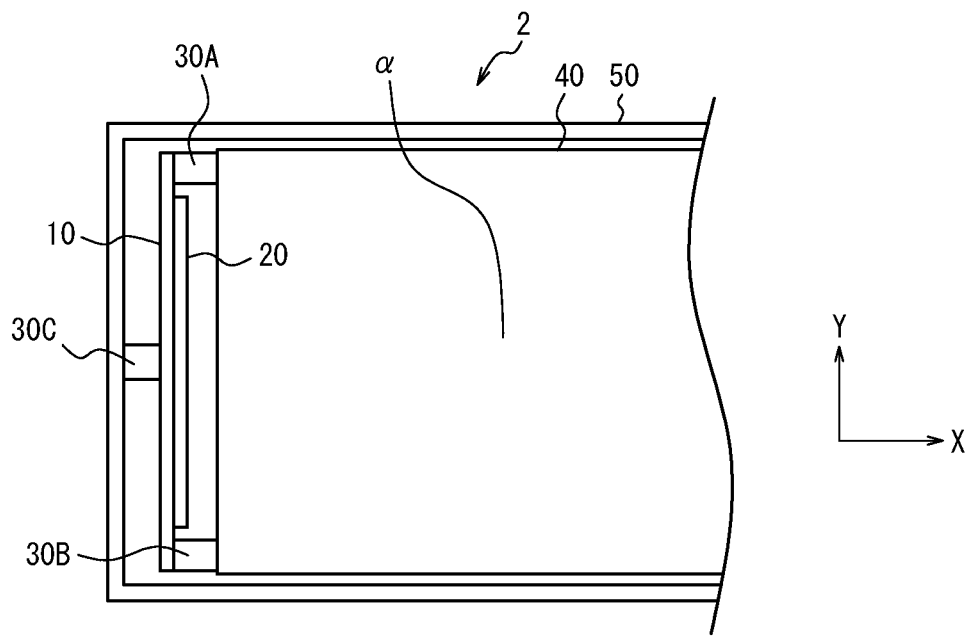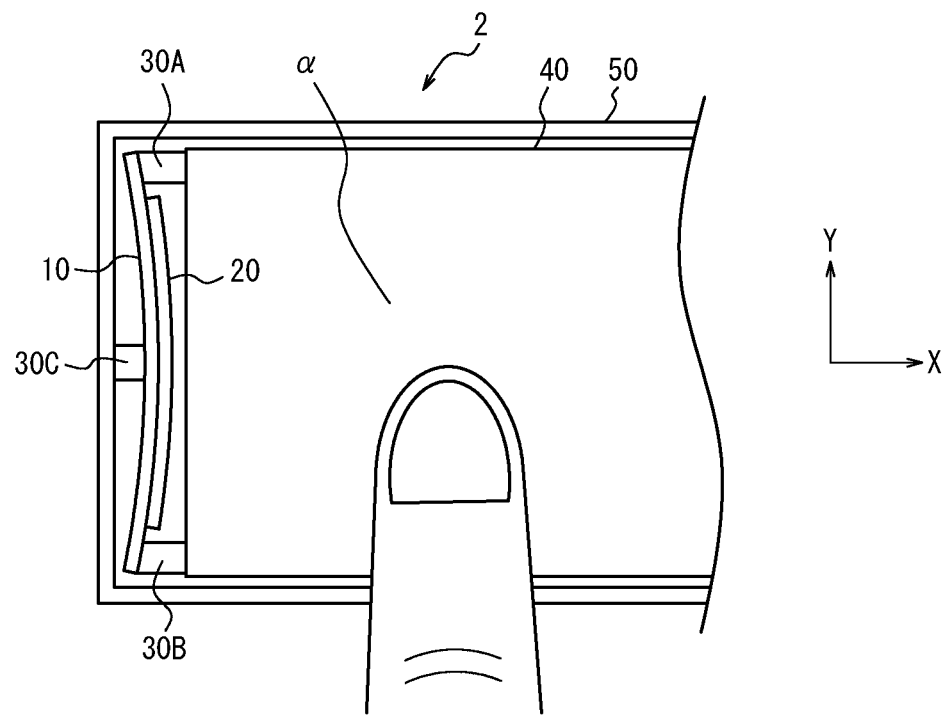

ELECTRONIC DEVICE

CROSS-REFERENCE TO RELATED APPLICATION

The present application claims priority to and the benefit of Japanese Patent Application No. 2015-224962 filed Nov. 17, 2015, the entire contents of which are incorporated herein by reference.

TECHNICAL FIELD

The present disclosure relates to an electronic device that detects a press.

BACKGROUND

In recent years, apparatuses have been able to provide haptic feedback, for example to a user's fingertip. A typical example is an apparatus that provides a tactile sensation to a user's fingertip through a touch panel in response to an operation on the touch panel. For example, see patent literature (PTL) 1. If, for example, the user operates the touch panel of such an apparatus, the touch panel being touched by the user's fingertip or the like is vibrated. Such a configuration allows the user to be notified that input from the user's operation has been recognized by the apparatus.

CITATION LIST

Patent Literature

PTL 1: JP 4975722 B2

SUMMARY

An electronic device according to the present disclosure comprises a panel and a press detector configured to detect a press.

The press detector detects the press on the basis of a force in a direction different from a press direction of the panel.

BRIEF DESCRIPTION OF THE DRAWINGS

In the accompanying drawings:

FIGS. 9A and 9B illustrate operations of the electronic device according to the second embodiment of the present disclosure;

DETAILED DESCRIPTION

Figure 1:
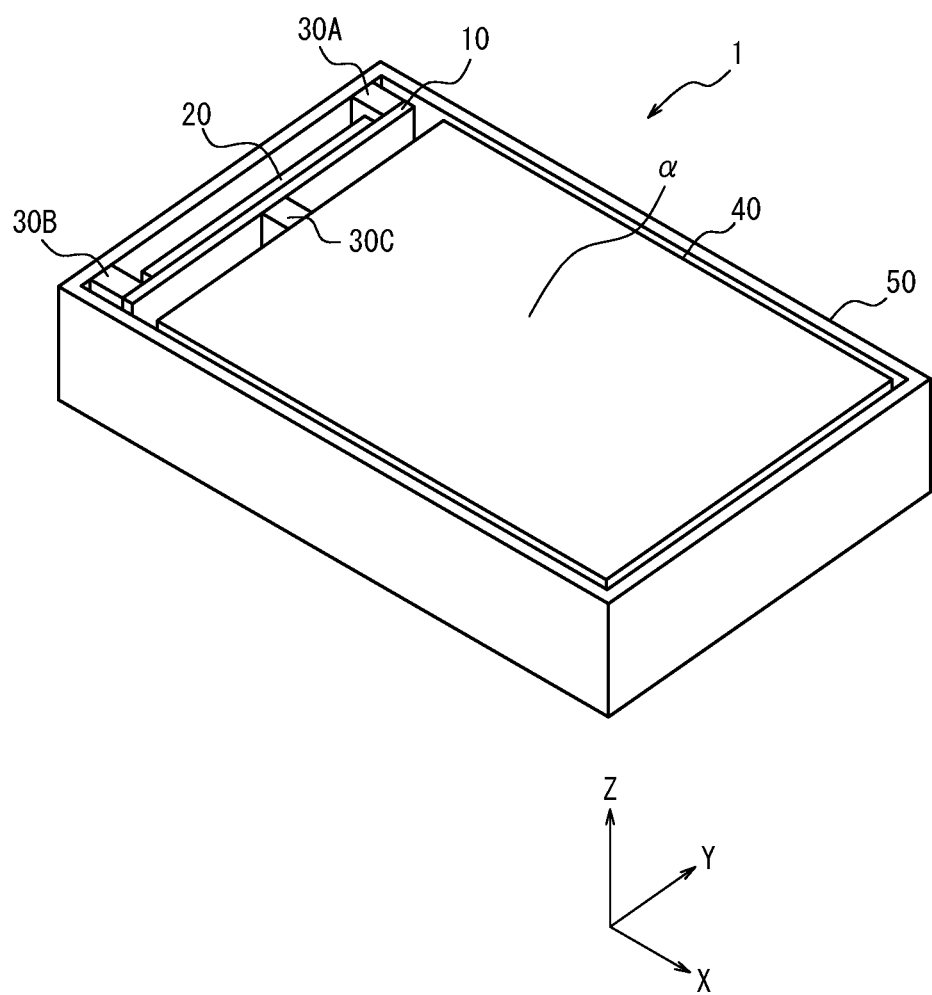
FIG. 1 is a perspective view illustrating the appearance of an electronic device according to a first embodiment of the present disclosure.

A technique for providing a good tactile sensation, such as the clicking feeling obtained when pressing a mechanical key, button, or the like, is desirable in apparatuses that provide haptic feedback to a user, so as to offer the user a good sense of operation. These apparatuses can offer the user a good sense of operation by detecting a press due to user operation and providing a tactile sensation when the press satisfies a predetermined standard. In this way, a good tactile sensation such as the one obtained when operating a metal dome switch can be provided.

Different requirements may be placed on the configuration of the mechanism for detecting a press in such apparatuses in accordance with apparatus specifications, various constraints, and the like. More variations on the configuration for detecting a press are thus desirable. The electronic device according to an embodiment of the present disclosure can increase the number of variations on the configuration for detecting a press due to user operation.

Embodiments of the present disclosure are described below with reference to the drawings.

In the embodiments below, an apparatus that detects a press due to user operation on a panel is described as an example of an electronic device. As described below, this apparatus can also offer the user a sense of operation by providing a tactile sensation on the panel. This apparatus can provide a tactile sensation to the user's fingertip or the like (or to a device such as a stylus) that is touching the panel in accordance with a user operation performed on the panel, for example. By obtaining a sense of operation through tactile sensation on the fingertip or the like, the user can learn that input from the operation has been recognized by the apparatus.

Examples of such an electronic device that detects a press include mobile phones, smartphones, phablets, tablet PCs, and the like. The electronic device that detects a press is not limited to these examples, however, and may also be applied to any electronic device having a panel as the part that detects a press (and provides a tactile sensation), such as a PDA, remote control, portable music player, game device, or the like. The electronic device that detects the press is not limited to being a portable electronic device like the ones listed above. The electronic device may be any device that has a panel, such as a desktop PC, a bank ATM, a ticket machine at a station, or the like.

The electronic device provided with a panel may also be adopted in an in-vehicle control panel mounted in the steering wheel, car navigation, or dashboard of an automobile, or may be adopted in any other type of vehicle other than an automobile. Furthermore, the electronic device provided with a panel is not limited to vehicles and may be any of various electronic devices, such as household appliances.

The electronic device of the present disclosure can be adopted in an electronic device provided with a touch sensor but is not limited to devices having a touch sensor. To focus on detection of a press (and provision of a tactile sensation), the electronic device according to the present embodiment is described as being an apparatus provided with a panel. A description of the function for detecting a contact position, such as a touch sensor, is kept brief or omitted entirely.

First Embodiment

Figure 2:
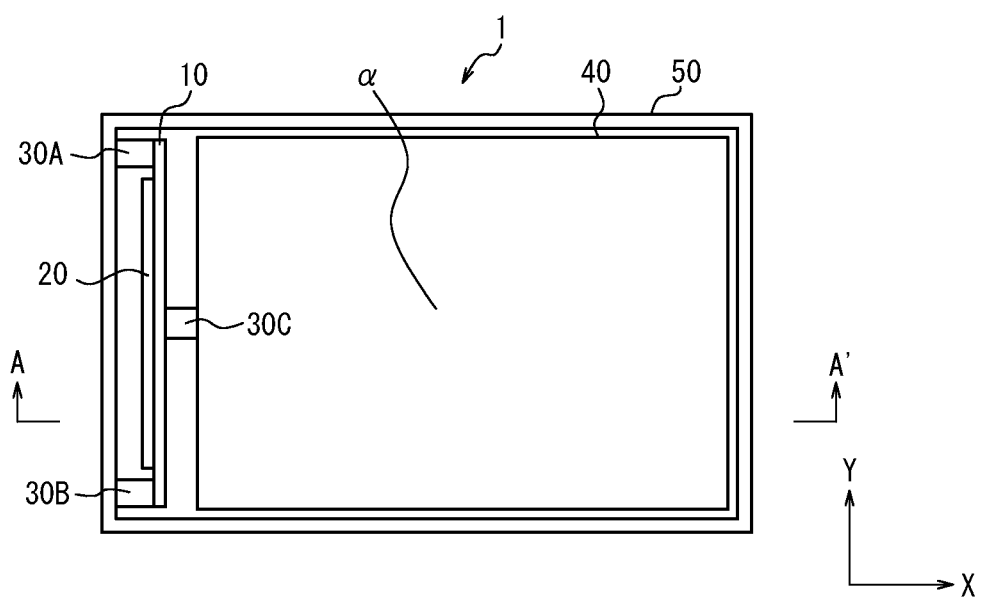
FIG. 2 illustrates the electronic device according to the first embodiment of the present disclosure.

FIG. 1 is a perspective view illustrating the appearance of an electronic device according to a first embodiment of the present disclosure. FIG. 2 is a top view of the electronic device according to the first embodiment. In other words, FIG. 2 is a view of the electronic device in FIG. 1 in the negative direction along the Z-axis.

As illustrated in FIGS. 1 and 2, the electronic device 1 according to the present embodiment is provided with a plate member 10 and a piezoelectric element 20 supported by the plate member 10. In the present embodiment, the element that is configured to include the plate member 10 and the piezoelectric element 20 is referred to as appropriate as a "press detector 25", i.e. as an element that detects a press.

Figure 3A:
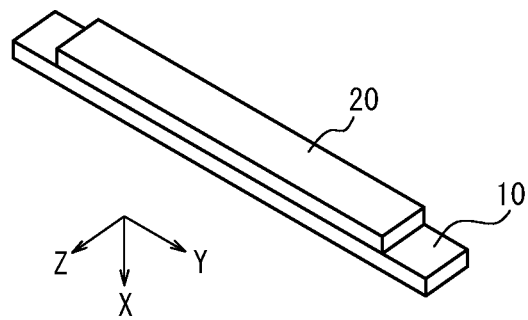
FIGS. 3A, 3B, 3C, and 3D illustrate the appearance of an example press detector in the electronic device according to the first embodiment of the present disclosure.
Figure 3B:
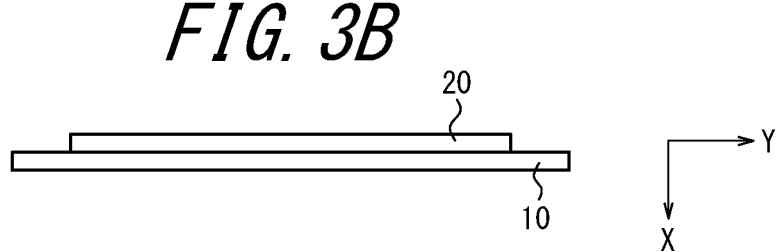
Figure 3C:
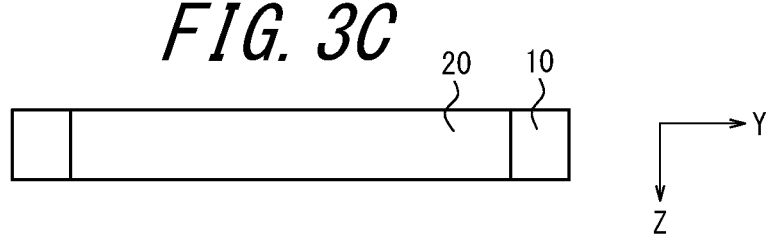
Figure 3D:
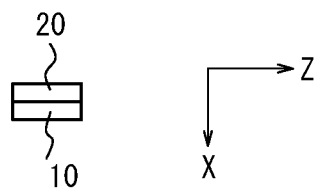

FIGS. 3A, 3B, 3C, and 3D illustrate the appearance of an example press detector 25 (10, 20) in the electronic device 1 according to the first embodiment. FIGS. 3A, 3B, 3C, and 3D illustrate the press detector 25 as extracted from the electronic device 1 in FIGS. 1 and 2. FIG. 3A is a perspective view of the appearance of the press detector 25. FIG. 3B is a side view of the press detector 25, i.e. a view of the press detector 25 in FIG. 3A in the negative direction along the Z-axis. FIG. 3C is a top view of the press detector 25, i.e. a view of the press detector 25 in FIG. 3A in the positive direction along the X-axis. FIG. 3D is a side view of the press detector 25, i.e. a view of the press detector 25 in FIG. 3A in the positive direction along the Y-axis.

As illustrated in FIGS. 3A to 3D, the press detector 25 according to the present embodiment is configured to include the plate member 10 and the piezoelectric element 20. The piezoelectric element 20 is preferably adhered to the plate member 10. In this way, the piezoelectric element 20 is supported in a state of adhesion to the plate member 10. An appropriate adhesive, double-sided tape, or the like can be used to adhere the piezoelectric element 20 to the plate member 10.

In the example in FIGS. 3A to 3D, the plate member 10 allows the piezoelectric element 20 to be easily connected to another member. In other words, connecting the plate member 10 to another member makes it unnecessary to connect the piezoelectric element 20 directly to the other member. The plate member 10 can be made of an appropriate material with suitable rigidity, such as a thin plate-shaped metal or ceramic, like a shim. If the rigidity of the plate member 10 is too high (too large), the plate member 10 impedes the bending of the piezoelectric element 20 adhered thereto, inhibiting appropriate detection of a press. Furthermore, when using the press detector 25 as an actuator that provides a tactile sensation, the provided tactile sensation is reduced if the rigidity of the plate member 10 is too high (too large), causing the plate member 10 to inhibit the bending of the piezoelectric element 20 adhered thereto. Conversely, if the rigidity of the plate member 10 is too low (too small), the strength upon adhering the plate member 10 and another member may be insufficient.

The piezoelectric element 20 is formed by an element that, upon application of an electric signal (voltage), either expands and contracts or bends in accordance with the electromechanical coupling coefficient of its constituent material. The piezoelectric element 20 can be used as an actuator by taking advantage of such expansion and contraction or bending movement. The piezoelectric element 20 also generates an electric signal (voltage) by expanding and contracting or bending upon application of an external force. The voltage generated in this way can be used for the piezoelectric element 20 to act as a pressure sensor that detects a press. The piezoelectric element 20 can be made of ceramic or crystal, for example. The press detector 25 in FIGS. 3A to 3D is a unimorph-type in which the piezoelectric element 20 is adhered to one side of the plate member 10.

When operating the press detector 25 in FIGS. 3A to 3D as an actuator, the piezoelectric element 20 expands and contracts upon the application of an electric signal (voltage), but the plate member 10 to which the piezoelectric element 20 is attached does not expand and contract. Hence, the actuator bends upon voltage being applied to the piezoelectric element 20. The waveform generated by the bending has amplitude in the X-axis direction, with the ends in the longitudinal direction (Y-axis direction) of the actuator as "nodes" and the central portion in the longitudinal direction of the actuator as an "antinode". For example, if the actuator bends in the positive X-axis direction upon voltage of a certain polarity being applied to the piezoelectric element 20, then the actuator bends in the negative X-axis direction upon reversing the polarity of the voltage applied to the piezoelectric element 20.

On the other hand, when operating the press detector 25 in FIGS. 3A to 3D as a pressure sensor, the piezoelectric element 20 attached to the plate member 10 expands or contracts upon application of an external force that causes the plate member 10 and the piezoelectric element 20 to bend. Hence, when this pressure sensor bends, the piezoelectric element 20 generates an electric signal (voltage). At this time, the pressure sensor bends to have amplitude in the X-axis direction, with the ends in the longitudinal direction (Y-axis direction) of the pressure sensor as "nodes" and the central portion in the longitudinal direction of the pressure sensor as an "antinode". For example, if the press detector 25 bends in the positive X-axis direction and the piezoelectric element 20 generates positive voltage, then the piezoelectric element 20 generates negative voltage upon the press detector 25 bending in the negative X-axis direction.

In a typical, simple configuration, the press detector 25 in FIGS. 3A to 3D can include the plate member 10 and the piezoelectric element 20. The press detector 25 may, however, be configured also to include other components such as a joining member, an adhering member, and/or a reinforcing member. In a more simple configuration, the press detector 25 is formed only by the piezoelectric element 20, for example, without including the plate member 10.

The press detector 25 that can be used in the electronic device 1 according to the present embodiment is not limited to being a unimorph-type as illustrated in FIGS. 3A to 3D. A different type of press detector 25 may be used in the electronic device 1 according to the present embodiment. For example, a bimorph-type press detector 25 may be used in the electronic device 1 according to the present embodiment.

Figure 4A:
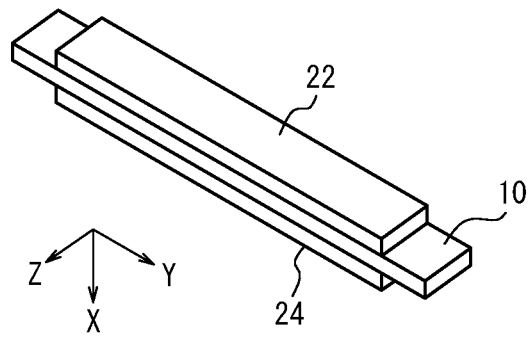
FIGS. 4A, 4B, 4C, and 4D illustrate the appearance of another example press detector in the electronic device according to the first embodiment of the present disclosure.
Figure 4B:
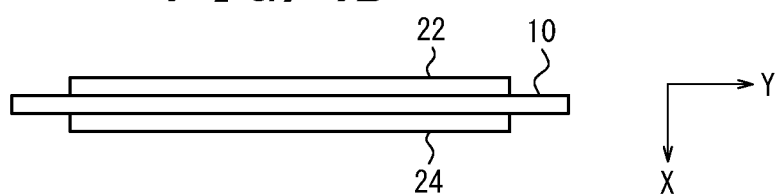
Figure 4C:
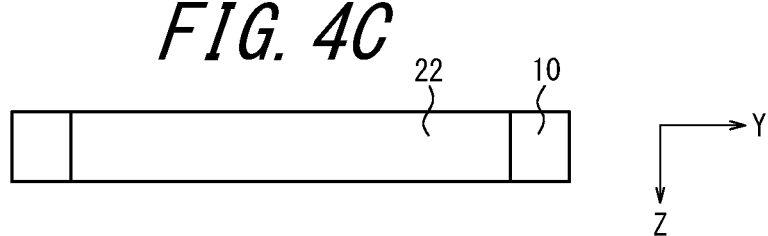
Figure 4D:
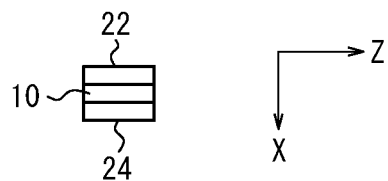

FIGS. 4A, 4B, 4C, and 4D illustrate the appearance of another example press detector 25, which is a bimorph-type, in the electronic device 1 according to the first embodiment. Like FIGS. 3A to 3D, FIGS. 4A to 4D illustrate the press detector 25 as extracted from the electronic device 1 in FIGS. 1 and 2. FIG. 4A is a perspective view of the appearance of the press detector 25. FIG. 4B is a side view of the press detector 25, i.e. a view of the press detector 25 in FIG. 4A in the negative direction along the Z-axis. FIG. 4C is a top view of the press detector 25, i.e. a view of the press detector 25 in FIG. 4A in the positive direction along the X-axis. FIG. 4D is a side view of the press detector 25, i.e. a view of the press detector 25 in FIG. 4A in the positive direction along the Y-axis.

The press detector 25 in FIGS. 4A to 4D is configured to include the plate member 10 and two piezoelectric elements 22 and 24. The press detector 25 can be configured as a bimorph-type actuator in which the piezoelectric elements 22 and 24 are adhered to the sides of the plate member 10. The piezoelectric elements 22 and 24 are preferably adhered to the plate member 10. In this way, the piezoelectric elements 22 and 24 are supported in a state of adhesion to the plate member 10. An appropriate adhesive, double-sided tape, or the like can also be used to adhere the piezoelectric elements 22 and 24 to the plate member 10.

The press detector 25 in FIGS. 4A to 4D can be configured so that when operating the press detector 25 as an actuator, the piezoelectric elements 22 and 24 bend in the same direction by appropriately adjusting the polarity of voltage applied to the piezoelectric elements 22 and 24. The waveforms generated by this bending as well have amplitude in the X-axis direction, with the ends in the longitudinal direction (Y-axis direction) of the actuator as "nodes" and the central portion in the longitudinal direction of the actuator as an "antinode". Consequently, a bimorph-type actuator bends upon application of an electric signal (voltage). Typically, a greater amount of bending displacement and stronger bending power can be achieved by using a bimorph-type actuator than by using a unimorph-type piezoelectric voltage actuator.

On the other hand, when operating the press detector 25 in FIGS. 4A to 4D as a pressure sensor, the piezoelectric elements 22 and 24 attached to the plate member 10 expand or contract upon application of an external force that causes the plate member 10 and the piezoelectric elements 22 and 24 to bend. Hence, when this pressure sensor bends, the piezoelectric elements 22 and 24 generate an electric signal (voltage).

In a typical, simple configuration, the press detector 25 in FIGS. 4A to 4D can include the plate member 10 and the piezoelectric elements 22 and 24. The press detector 25 may, however, be configured also to include a joining member, an adhering member, and/or a reinforcing member. Furthermore, the press detector 25 may be configured to include laminated piezoelectric elements. Examples of a laminated piezoelectric element include a laminated bimorph element with layers of bimorph. Such a laminated piezoelectric element may have a laminated structure formed by a plurality of dielectric layers composed of, for example, lead zirconate titanate (PZT) and electrode layers disposed between the dielectric layers.

Either of the press detectors 25 illustrated in FIGS. 3A to 3D and FIGS. 4A to 4D may be used in the electronic device 1 according to the present embodiment. An electronic device 1 that uses the unimorph-type press detector 25 illustrated in FIGS. 3A to 3D is described below.

As illustrated in FIGS. 1 and 2, connecting portions 30A, 30B, and 30C connect to the press detector 25 (10, 20) in the electronic device 1 according to the present embodiment. The electronic device 1 according to the present embodiment also includes a panel 40 and a base 50.

As illustrated in FIGS. 1 and 2, the panel 40 has an interface surface α that is the operation surface on which operations are performed by the user's fingertip or the like. The electronic device 1 detects a press due to user operation performed on the interface surface α. The panel 40 can be made from any material that has the appropriate rigidity for performance of operations by the user's fingertip or the like, such as plastic, synthetic resin, glass, or metal. The interface surface α also functions as the surface, on the panel 40, that provides a tactile sensation to the user's fingertip or the like. The panel 40 can therefore be made of any material that also has the appropriate rigidity for providing a tactile sensation to the user's fingertip or the like.

The panel 40 is not limited to the configuration illustrated in FIGS. 1 and 2, and a variety of configurations may be adopted. For example, the panel 40 may be hollow behind the interface surface α, and the inside of the panel 40 may be hermetically sealed. The panel 40 may be a member with a relatively large thickness (size in the Z-axis direction), such as 3 cm to 5 cm, or a relatively small thickness, such as 1 mm to 3 mm. The panel 40 can be set to any thickness in accordance with various requirements or specifications of the electronic device 1.

The interface surface α of the panel 40 can be configured by a translucent member, and a display can be provided on the back surface side of the interface surface α, such as a liquid crystal display (LCD). Furthermore, the interface surface α of the panel 40 can have a function to detect a contact position, like a touch sensor. A member having a function to detect a contact position like a touch sensor can be provided on the interface surface α of the panel 40. A more detailed explanation of a display function via the panel 40 and a function to detect contact on the interface surface α of the panel 40 is omitted below.

The base 50 forms a base that supports the panel 40. The base 50 may, for example, constitute a housing of the electronic device 1. The base 50 may also constitute a protective member of the panel 40 and/or the press detector 25. The base 50 can be made from any material that has appropriate rigidity, such as plastic, synthetic resin, glass, or metal. The base 50 is not limited to the configuration illustrated in FIGS. 1 and 2 and may be configured in a variety of shapes and/or sizes in accordance with various requirements or specifications of the electronic device 1.

In FIGS. 1 and 2, the depiction of the base 50 is simplified to illustrate operations of the electronic device 1 according to the present embodiment. When using the electronic device 1 as an actual electronic device, a bezel covering the peripheral portion of the interface surface α of the panel 40 may be formed on the base 50 to prevent the panel 40 from popping out of the base 50 (in the positive direction along the Z-axis).

Connection of the press detector 25 (10, 20) to the panel 40 and base 50 according to the present embodiment is described next.

In the present embodiment, as illustrated in FIGS. 1 and 2, the press detector 25 (10, 20) connects to the panel 40 and the base 50. In this way, the press detector 25 (10, 20) is attached to the base 50 and the panel 40 in the electronic device 1. In the present embodiment, the press detector 25 (10, 20) can be connected to the panel 40 and the base 50 using the connecting portions 30.

As illustrated in FIGS. 1 and 2, the connecting portions 30A and 30B connect the press detector 25 (10, 20) to the base 50. In greater detail, the connecting portions 30A and 30B can connect the ends of the press detector 25 in the longitudinal direction (Y-axis direction) to an inner wall of the base 50. The "ends" of the press detector 25 in the longitudinal direction (Y-axis direction) are not necessarily the exact terminal portions of the press detector 25 (10, 20) in the longitudinal direction. The ends of the press detector 25 in the longitudinal direction (Y-axis direction) may, for example, be the areas near the ends of the piezoelectric element 20 or the areas near the ends of the plate member 10. The ends of the press detector 25 in the longitudinal direction (Y-axis direction) may also be two positions separated by a certain distance in the longitudinal direction of the press detector 25, such as positions inward from the ends of the press detector 25 (10, 20) in the longitudinal direction. The amplitude when the press detector 25 bends, however, can be increased more as the ends of the press detector 25 in the longitudinal direction (Y-axis direction) are closer to the terminal portions of the press detector 25 (10, 20) in the longitudinal direction.

As illustrated in FIGS. 1 and 2, the connecting portion 30C connects the press detector 25 (10, 20) to the panel 40. In greater detail, the connecting portion 30C can connect the central portion of the press detector 25 in the longitudinal direction (Y-axis direction) to the panel 40. The connecting portion 30C may connect the press detector 25 to the central portion of the periphery of the panel 40. The central portion of the press detector 25 in the longitudinal direction (Y-axis direction) is not necessarily the exact center of the press detector 25 (10, 20) in the longitudinal direction. The amplitude when the press detector 25 bends, however, can be increased more as the central portion of the press detector 25 in the longitudinal direction (Y-axis direction) is closer to the center of the press detector 25 (10, 20) in the longitudinal direction.

The ends of the press detector 25 in the longitudinal direction (Y-axis direction) may be the ends of the plate member 10 or of the piezoelectric element 20. Similarly, the central portion of the press detector 25 in the longitudinal direction (Y-axis direction) may be the central portion of the plate member 10 or of the piezoelectric element 20.

Next, the operations of the electronic device 1 according to the present embodiment are described.

Figure 5A:
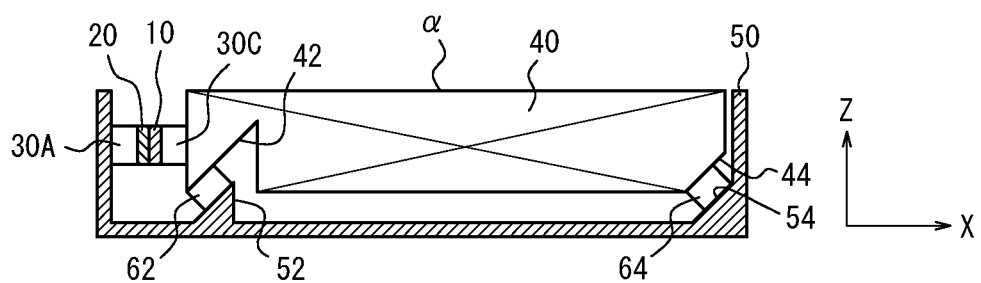
FIGS. 5A and 5B illustrate operations of an electronic device according to the first embodiment of the present disclosure.
Figure 5B:
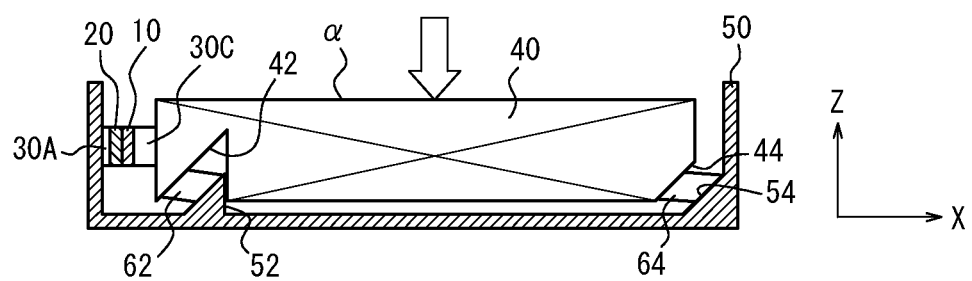
Figure 6A:
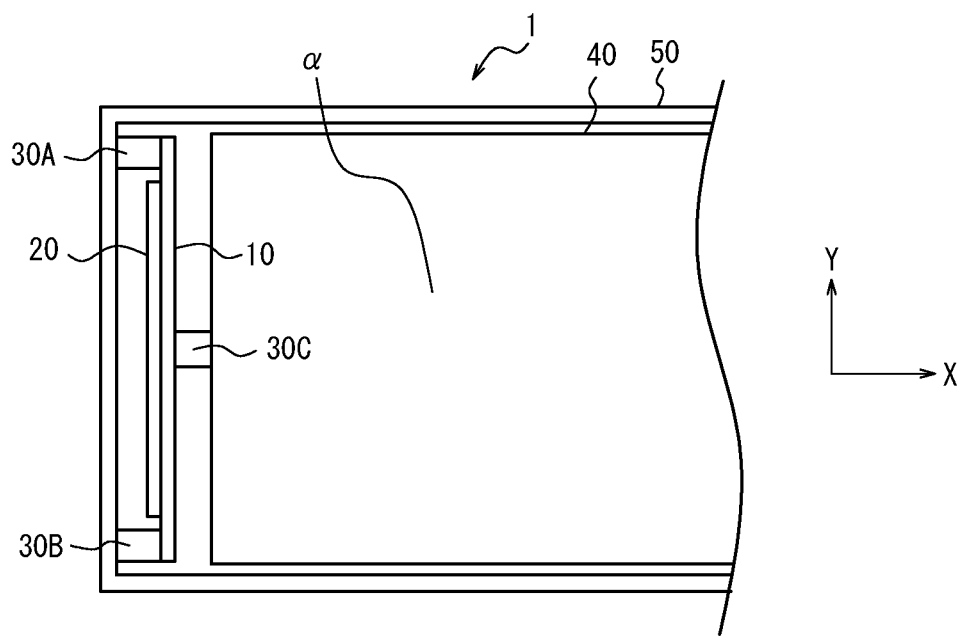
FIGS. 6A and 6B illustrate operations of an electronic device according to the first embodiment of the present disclosure.
Figure 6B:
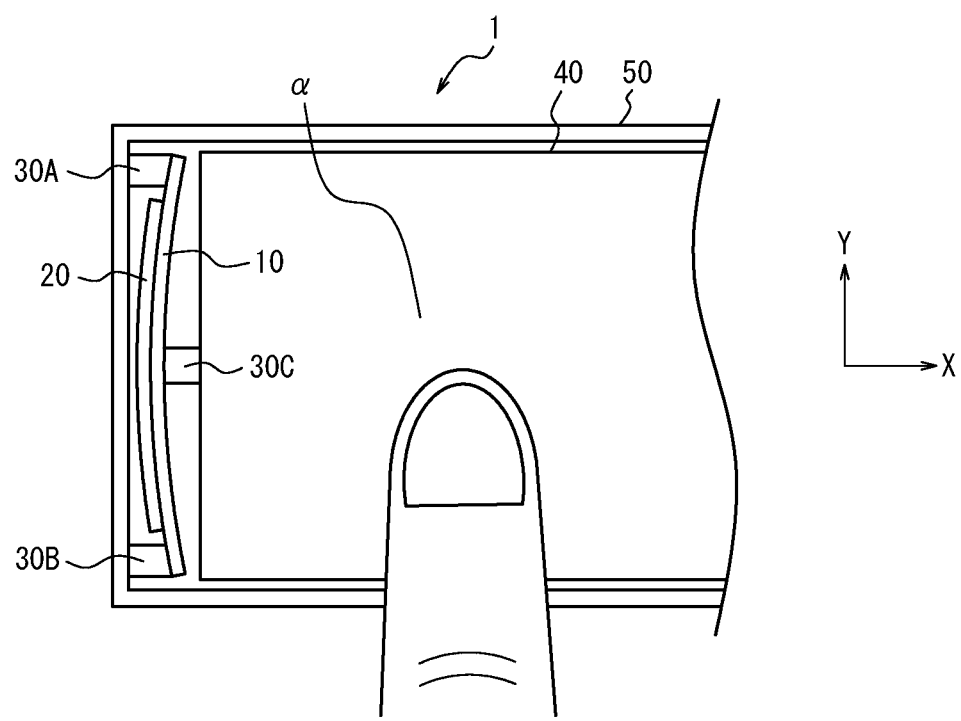

FIGS. 5A, 5B, 6A, and 6B illustrate operations of the electronic device 1 according to the first embodiment. FIGS. 5A and 5B are cross-sections along the A-A' line of the electronic device 1 in FIG. 2. FIG. 5A illustrates the state before the electronic device 1 detects a press. FIG. 5B illustrates the state while the electronic device 1 is detecting a press. FIGS. 6A and 6B are enlarged views of the top surface of the electronic device 1, i.e. enlargements of the electronic device 1 viewed in the negative direction along the Z-axis. In correspondence with FIG. 5A, FIG. 6A illustrates the state before the electronic device 1 detects a press. In correspondence with FIG. 5B, FIG. 6B illustrates the state while the electronic device 1 is detecting a press.

As illustrated in FIGS. 5A and 5B, the base 50 in the electronic device 1 according to the present embodiment is structured so that at least a part of a portion supporting the panel 40 on the inner surface of the base 50 has an inclination. The portions having this inclined structure are referred to below as the inclined portions 52, 54 in the base 50.

In correspondence with the inclined portions 52, 54 in the base 50, the panel 40 in the electronic device 1 according to the present embodiment is structured so that at least a part of a portion supported by the base 50 has an inclination. The portions having this inclined structure are referred to below as the inclined portions 42, 44 in the panel 40.

As illustrated in FIGS. 5A and 5B, an elastic member 62 is interposed between the inclined portion 42 in the panel 40 and the inclined portion 52 in the base 50 in the electronic device 1 according to the present embodiment. An appropriate adhesive, double-sided tape, or the like can be used to adhere the elastic member 62 to the inclined portion 42 in the panel 40 and the inclined portion 52 in the base 50. Similarly, an elastic member 64 is interposed between the inclined portion 44 in the panel 40 and the inclined portion 54 in the base 50 in the electronic device 1. An appropriate adhesive, double-sided tape, or the like can be used to adhere the elastic member 64 to the inclined portion 44 in the panel 40 and the inclined portion 54 in the base 50. In this way, the elastic members 62, 64 are arranged between the panel 40 and the base 50 in the electronic device 1 according to the present embodiment.

A material that has a hardness (flexibility) appropriate for deforming upon being pressed, has high rebound resilience, and does not crack easily when repeatedly deformed may be used for the elastic members 62, 64. The elastic members 62, 64 can be formed from a material such as silicon rubber, natural rubber, nitrile rubber, fluorine rubber, or ethylene vinyl acetate rubber.

In the example in FIGS. 5A and 5B, the elastic members 62, 64 are, for example, envisioned as members formed as cuboids or cylinders installed near the four corners at the back of the panel 40 (the back surface side, i.e. the side viewed in the positive direction along the Z-axis). The elastic members 62, 64 are not, however, limited to the example in FIGS. 5A and 5B. For example, as illustrated by the cross-sections of the elastic members 62, 64 in FIGS. 5A and 5B, the elastic members 62, 64 may be two elongated members whose longitudinal direction is the Y-axis direction.

User operations are performed on the interface surface $\alpha$ of the electronic device 1. Consequently, a press due to user operation is applied in the negative direction along the Z-axis to the interface surface $\alpha$, as illustrated in FIGS. 5A and 5B. The arrow in FIG. 5B indicates the direction of the press due to user operation. In such a configuration, pressure on the interface surface $\alpha$ can be detected by placing a sensor for detecting a press between the back side of the panel 40, i.e. the bottom surface of the panel 40, and the inner bottom surface of the base 50. Because of the configuration of the electronic device, however, it is assumed that placing a member, such as a sensor for detecting a press, on the back side of the panel 40 that has the interface surface $\alpha$ may not be desirable. It is also assumed that such placement may be impossible in the first place.

In the present embodiment, as illustrated in FIGS. 5A, 5B, 6A, and 6B, the press detector 25 (10, 20) is therefore placed on the side of the panel 40, i.e. at the periphery of the panel

40. In FIGS. 5A, 5B, 6A, and 6B, the press detector 25 (10, 20) is placed on the left side of the panel 40. In this way, the electronic device 1 according to the present embodiment detects a press on the interface surface α in a direction (negative direction along the X-axis) different from the direction of the press (negative direction along the Z-axis). The combination of the force of the press due to user operation on the interface surface α (negative direction along the Z-axis) and the elastic force of the elastic members 62, 64 disposed at an inclination includes a component in the transverse direction (negative direction along the X-axis). Accordingly, the electronic device 1 can detect a press due to user operation on the interface surface α using the press detector 25 (10, 20) disposed on the side of the panel 40.

When the user operation is performed on the interface surface α in the state illustrated in FIG. 5A and a press is applied in the negative direction along the Z-axis, the electronic device 1 enters a state such as the one illustrated in FIG. 5B. As illustrated in FIG. 5B, the panel 40 that was pressed sinks in the negative direction along the Z-axis and is also displaced in the negative direction along the X-axis. Furthermore, as illustrated in FIG. 5B, the elastic members 62, 64 respectively deform between the inclined portions 52, 54 in the base 50 and the inclined portions 42, 44 in the panel 40, in accordance with the press on the panel 40. As illustrated in FIGS. 5A and 5B, the elastic members 62, 64 are disposed in an inclined state relative to the panel 40 and the base 50. Consequently, when the interface surface α is pressed, displacing the panel 40 in the negative direction along the Z-axis, the panel 40 is also displaced in the negative direction along the X-axis while the elastic members 62, 64 are slightly crushed. The press detector 25 (10, 20) can therefore detect a press on the interface surface α on the basis of such displacement in the negative direction along the X-axis.

As illustrated in FIG. 5A, the panel 40 is not displaced while in a state in which the interface surface α is not being pressed. Hence, as illustrated in FIG. 6A, the press detector 25 (10, 20) is not bent in this state. Consequently, the piezoelectric element 20 of the press detector 25 does not generate voltage in the state illustrated in FIGS. 5A and 6A. The electronic device 1 therefore detects the press on the interface surface α as being zero.

On the other hand, as illustrated in FIG. 5B, the panel 40 is displaced while in a state in which the interface surface α is being pressed. Hence, as illustrated in FIG. 6B, the press detector 25 (10, 20) is bent in this state. Consequently, the piezoelectric element 20 of the press detector 25 generates voltage in the state illustrated in FIGS. 5B and 6B. The electronic device 1 therefore detects the press on the interface surface α.

In the state illustrated in FIGS. 5B and 6B, the amount of displacement of the panel 40 in the negative direction along the Z-axis and the amount of displacement of the panel 40 in the negative direction along the X-axis correspond somewhat linearly to the magnitude of the press on the interface surface α. Consequently, the electronic device 1 can detect a press due to user operation on the interface surface α by the press detector 25 (10, 20) being disposed on the side of the panel 40.

In this way, the press detector 25 in the electronic device 1 according to the present embodiment detects a press on the basis of a force in a direction different from the press direction (negative direction along the Z-axis) of the panel 40. Here, the direction different from the press direction (negative direction along the Z-axis) of the panel 40 can typically be a direction (negative direction along the X-axis) orthogonal to the press direction of the panel 40. In the electronic device 1 according to the present embodiment, the panel 40 is displaced, in accordance with the press on the interface surface α, with a displacement component in the press direction (negative direction along the Z-axis) of the panel 40 and also a displacement component in a direction (negative direction along the X-axis) orthogonal to the press direction.

As described above, the base 50 in the electronic device 1 according to the present embodiment is structured so that at least a part of a portion supporting the panel 40 has an inclination. The panel 40 in the electronic device 1 according to the present embodiment is displaced along the inclination of the inclined portions 52, 54 in the base 50 in accordance with a press on the interface surface α. Furthermore, the panel 40 in the electronic device 1 according to the present embodiment is displaced along the aforementioned inclination by the elastic members 62, 64 deforming in accordance with a press on the interface surface α.

Even in a configuration in which a member for detecting a press cannot easily be arranged on the back side (or the back surface side) of the panel 40, for example, the electronic device 1 according to the present embodiment can detect the press on the panel 40 by arranging the press detector 25 on the side of the panel 40. In this way, the electronic device 1 according to the present embodiment can increase the number of variations on the configuration for detecting a press due to user operation.

Next, the function in the electronic device 1 for providing a tactile sensation in accordance with a detected press is described.

As described above, by voltage being applied to the piezoelectric element 20 for the piezoelectric element 20 to bend and vibrate, the press detector 25 can be caused to function as an actuator that provides a tactile sensation. Specifically, when a voltage is applied to the piezoelectric element 20 and the press detector 25 (10, 20) bends with an antinode in the positive direction along the X-axis, the panel 40 connected to the press detector 25 (10, 20) is displaced in the positive direction along the X-axis. Furthermore, when a voltage is applied to the piezoelectric element 20 and the press detector 25 (10, 20) bends with an antinode in the negative direction along the X-axis, the panel 40 connected to the press detector 25 (10, 20) is displaced in the negative direction along the X-axis, as illustrated in FIG. 5B. Consequently, if the user touches the interface surface α of the panel 40 with a finger or the like when the press detector 25 is driven, the electronic device 1 can provide a tactile sensation to the user's fingertip or the like on the interface surface α.

Here, the operation by which the user presses a finger or the like to the interface surface α of the panel 40 is a movement that includes a component in the lengthwise direction (Z-axis direction) relative to the interface surface α of the panel 40. On the other hand, the tactile sensation provided by the electronic device 1 is a movement to displace the panel 40 in the transverse direction (X-axis direction) relative to the interface surface α. In other words, the direction in which a user performs an operation and the direction in which a tactile sensation is provided differ in the electronic device 1.

However, the applicant confirmed by experiment that most users perceive a tactile sensation that causes displacement in the transverse direction (X-axis direction) relative to the interface surface α as being a tactile sensation provided in the direction in which operations are performed (Z-axis direction). In other words, even if a tactile sensation is provided to displace the panel 40 in a direction (X-axis direction) perpendicular to the direction in which the user presses (Z-axis direction), then along with a click sensation, the user can be caused to feel as though the panel 40 sinks in the direction that the user pressed (Z-axis direction). Also, if a tactile sensation is provided to displace the panel 40 in a direction (X-axis direction) perpendicular to the direction in which the user presses (Z-axis direction) when the user reduces the pressure, then the user can be caused to feel as though the panel 40 is being released, in the direction that the press is released (Z-axis direction), to return to its former state.

In this way, by appropriately adjusting the voltage, amount of displacement (amplitude of bending), frequency, and the like for driving the press detector 25 as an actuator, the electronic device 1 can offer the user a sense of operation in the direction of pressing on the interface surface α of the panel 40.

So that the electronic device 1 can efficiently provide a tactile sensation, a configuration that allows good displacement of the panel 40 relative to the base 50 is preferred. If the friction of the portion where the base 50 and the panel 40 are in contact grows large, the panel 40 cannot be displaced in the transverse direction (X-axis direction) inside the base 50 as easily, preventing a tactile sensation from being provided efficiently. In the present embodiment, the panel 40 is supported by the base 50 with the elastic members 62, 64 interposed therebetween, as illustrated in FIGS. 5A and 5B. Hence, the panel 40 can be displaced well relative to the base 50 in the electronic device 1 according to the present embodiment.

As illustrated in FIGS. 6A and 6B, the connecting portions 30A, 30B, and 30C that connect the press detector 25 (10, 20) to the panel 40 and the base 50 are preferably configured to have an appropriate thickness (length in the X-axis direction). Specifically, the connecting portions 30A, 30B, and 30C are preferably configured to be thicker (length in the X-axis direction) than the amplitude (amount of displacement in the X-axis direction) when the press detector 25 (10, 20) bends.

When the press detector 25 (10, 20) bends with an antinode in the positive direction along the X-axis, the connecting portions 30A, 30B, and 30C may have any thickness (length in the X-axis direction). On the other hand, when the press detector 25 (10, 20) bends with an antinode in the negative direction along the X-axis, as illustrated in FIG. 6B, then bending of the press detector 25 is inhibited if the thickness (length in the X-axis direction) of the connecting portions 30A, 30B, and 30C is excessively small. For example, if the thickness (length in the X-axis direction) of the connecting portion 30C is reduced, then the ends in the longitudinal direction (Y-axis direction) of the press detector 25 that bends with an antinode in the negative direction along the X-axis abut the left side of the panel 40, inhibiting the bending of the press detector 25. Furthermore, if the thickness (length in the X-axis direction) of the connecting portions 30A, 30B is reduced, then the central portion in the longitudinal direction (Y-axis direction) of the press detector 25 that bends with an antinode in the negative direction along the X-axis abuts the inner surface of the base 50, inhibiting the bending of the press detector 25.

Therefore, as illustrated in FIG. 6B, the thickness (length in the X-axis direction) of the connecting portions 30A, 30B, and 30C is preferably greater than the amplitude of bending (amount of displacement in the X-axis direction) of the press detector 25 (10, 20). This configuration allows a larger amplitude of bending (amount of displacement in the X-axis direction) when driving the press detector 25. As a result, the amount of displacement of the panel 40 can also be increased, yielding a good and efficient tactile sensation provided by the electronic device 1.

Furthermore, the connecting portions 30A, 30B, and 30C preferably have a hardness (flexibility) that does not obstruct bending of the press detector 25 (10, 20). Specifically, the connecting portions 30A, 30B, and 30C are preferably configured to be elastic enough for the adhesive surface to deform slightly in conjunction with bending of the press detector 25 (10, 20). If the connecting portions 30A, 30B, and 30C are excessively elastic, the panel 40 might not be fixed stably to the base 50. Conversely, if the connecting portions 30A, 30B, and 30C are excessively rigid, the press detector 25 (10, 20) might not bend easily.

In this way, the electronic device 1 according to the present embodiment can be configured to drive the press detector 25 as an actuator that displaces the panel 40 in the transverse direction (X-axis direction) relative to the interface surface α. In this case, the electronic device 1 according to the present embodiment can be configured to displace the panel 40 in the transverse direction (X-axis direction) relative to the interface surface α and provide a tactile sensation on the interface surface α in accordance with a press detected by the press detector 25.

The electronic device 1 according to the present embodiment displaces the entire panel 40 in the transverse direction and can thereby provide a uniform tactile sensation, regardless of the position on the interface surface α of the panel 40. Some conventional devices provide a tactile sensation by installing a drive unit, such as an actuator, somewhere on the opposite side of the interface surface α of the panel 40, i.e. on the back surface side. In such an apparatus, the intensity of the provided tactile sensation can be increased near the position where the drive unit is installed, but the provided tactile sensation tends to diminish with increased distance from the position where the drive unit is installed. The electronic device 1 according to the present embodiment can provide a uniform tactile sensation regardless of the position that the user touches on the interface surface α of the panel 40.

Furthermore, in the electronic device 1 according to the present embodiment, the press detector 25 is connected and fixed to the panel 40 and the base 50 at three points by the three connecting portions 30A, 30B, and 30C. Consequently, the press detector 25 and the panel 40 can be fixed stably to the base 50 in the electronic device 1 both when the press detector 25 is and is not bending. With this form of connection, the electronic device 1 can also efficiently convey displacement of the press detector 25 to the panel 40. The electronic device 1 can therefore increase the amount of displacement by bending of the press detector 25 to efficiently provide a good tactile sensation.

Next, a configuration for implementing the functions of press detection and tactile sensation provision in the electronic device 1 according to the present embodiment is described.

Figure 7:
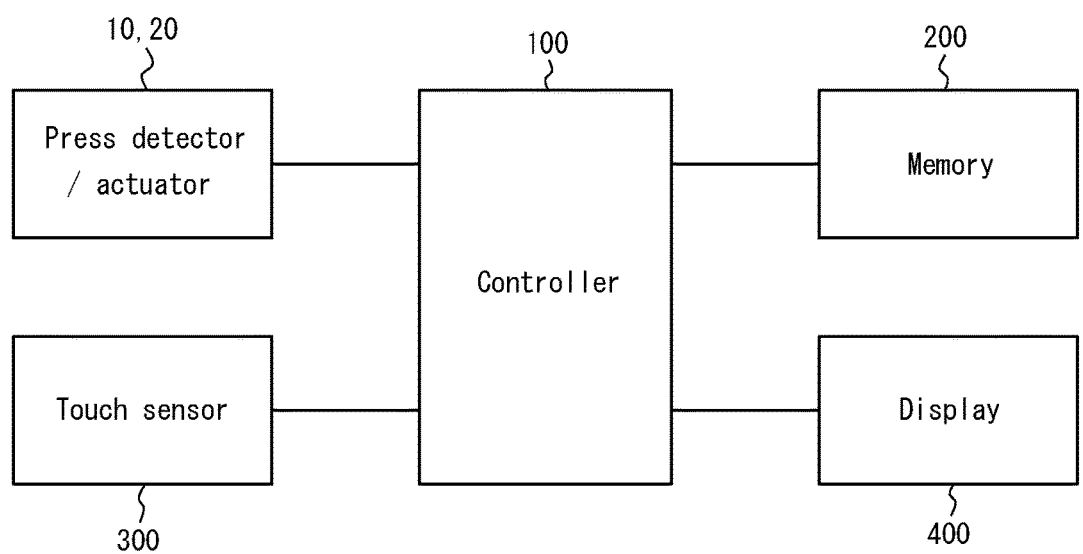
FIG. 7 is a block diagram schematically illustrating the configuration of the electronic device according to the first embodiment of the present disclosure.

FIG. 7 is a block diagram schematically illustrating the configuration of the electronic device 1 according to the first embodiment.

The electronic device 1 illustrated in FIG. 7 implements the function of detecting a press and also implements the function of providing a tactile sensation in accordance with a detected press. Hence, in addition to the press detector 25 (10, 20), the electronic device 1 preferably includes a controller 100, a memory 200, and the like, as illustrated in FIG. 7.

As described above, the press detector 25 (10, 20) not only has a function to detect a press, but also has the function of an actuator that provides a tactile sensation.

The controller 100 controls and manages the electronic device 1 overall, including the functional blocks of the electronic device 1. The controller 100 may be a processor such as a central processing unit (CPU) that executes a program with prescribed control procedures. The controller 100 may, for example, also be a dedicated microprocessor or a general-purpose CPU that executes specific processing by reading a specific program.

The memory 200 may be configured by any storage medium, such as a semiconductor memory, that stores programs executed by the controller 100 and various information, for example. The memory 200 can store information such as the results of data analysis and various types of arithmetic processing performed by the controller 100. The memory 200 also stores algorithms and various reference tables, such as lookup tables (LUTs), used by the controller 100 when performing data analysis and various types of arithmetic processing.

The controller 100 of the electronic device 1 according to the present embodiment detects a press using the press detector 25 (10, 20), and when the detected press reaches or exceeds a predetermined threshold, the controller 100 performs control to drive the press detector 25 (10, 20) and provide a tactile sensation.

Therefore, the controller 100 detects the voltage generated by the piezoelectric element 20 of the press detector 25 up until the press on the interface surface α reaches the predetermined threshold. Here, since the press detector 25 does not directly detect the press on the interface surface α, the controller 100 may perform calculation, conversion, or the like on the basis of the voltage from the press detector 25 to calculate the press on the interface surface α. The algorithm for calculation, the LUT for conversion, or other such necessary information may be obtained by performing experiments or the like in advance to test the characteristics of the press detector 25. This information may then be stored in the memory 200 and read by the controller 100 as necessary.

When the voltage generated by the piezoelectric element 20 of the press detector 25 or the press calculated on the basis of the voltage reaches or exceeds a predetermined threshold for providing a tactile sensation, the controller 100 performs control to drive the press detector 25 by applying a predetermined voltage thereto. Here, the predetermined voltage or the threshold of the press for providing a tactile sensation can be stored in the memory 200. Various information, such as the magnitude of voltage applied when driving the press detector 25, can also be stored in the memory 200. By the controller 100 driving the press detector 25 as an actuator in this way, a tactile sensation can be provided to the user's fingertip or the like on the interface surface α.

Such differentiation between whether to provide a tactile sensation in accordance with a detected press makes it possible, for example, not to provide a tactile sensation when the user makes light contact unintentionally, thereby informing the user that the apparatus did not recognize the operation as input. Furthermore, by a tactile sensation being provided when the detected pressing force exceeds a predetermined threshold, the user's sense of touch can be stimulated while stimulating the sense of pressure at the user's fingertip or the like. In other words, the sense of pressure at the user's fingertip or the like can be stimulated by the reaction to the pressing force until the detected press exceeds the predetermined threshold. When the press exceeds the predetermined threshold, the piezoelectric actuator is driven by a predetermined drive signal, the interface surface α of the panel 40 is vibrated, and the user's sense of touch at the fingertip or the like can be stimulated. By the user's sense of touch thus being stimulated while the sense of pressure is stimulated, a better, more realistic click sensation can be provided to the user's fingertip or the like. The click sensation referred to here is the same tactile sensation as that obtained when pressing a button switch, such as a mechanical (physical) button switch (push-button switch).

By including a touch sensor 300, the electronic device 1 according to the present embodiment can distinguish between whether to provide a tactile sensation in accordance with the position contacted by the user's fingertip or the like on the interface surface α of the panel 40. The touch sensor 300 is an input device for detecting the location contacted by the user's finger, a pen, or the like as an input position. The touch sensor 300 may be a device using any detection method, such as a capacitive system, a resistive film system, a surface acoustic wave system (or an ultrasonic wave system), an infrared system, an electromagnetic induction system, a load detection system, or the like.

By including a display 400, the electronic device 1 according to the present embodiment can indicate the position to be contacted by the user's fingertip or the like on the interface surface α of the panel 40. The display 400 can be any display device, such as a liquid crystal display (LCD), an organic EL display, or an inorganic EL display.

The display 400 can also be provided on the back side of the touch sensor 300, which transmits light. With this arrangement, contact corresponding to an object or the like displayed on the display 400 as an image is detected at the corresponding position on the touch sensor 300. The display 400 can display various images, such as characters and shapes. Additionally, the display 400 can display objects or icons, including push-button switches such as keys, as images. These objects or icons can be images suggesting to the user areas to be contacted on the touch sensor 300.

In FIG. 7, an example in which the electronic device 1 includes the touch sensor 300 and the display 400 has been described. In the present embodiment, however, the touch sensor 300 and the display 400 are not essential elements when focusing only on the functions by which the electronic device 1 detects a press and provides a tactile sensation.

In this way, the electronic device 1 according to the present embodiment can increase the number of variations on the configuration for detecting a press due to operation. The electronic device 1 according to the present embodiment can also efficiently provide a good tactile sensation on the basis of a press detected in this way.

In general, attaching an apparatus for detecting a press in the direction in which the interface surface is pressed to achieve the function of detecting a press due to user operation implies providing a press detector at the lower side of the panel. The thickness of the electronic device increases by taking this approach. In the electronic device 1 according to the present embodiment, the press detector 25 (10, 20) is provided at the side of the panel 40 rather than below the panel 40. Consequently, the thickness in the direction in which the interface surface α is pressed can be reduced in the electronic device 1 overall.

The electronic device 1 according to the present embodiment causes the press detector 25 (10, 20) not only to detect a press but also to function as an actuator for providing a tactile sensation. Therefore, space and costs can be reduced as compared to when these functions are configured by separate components. Electronic devices are increasingly required to be compact, lightweight, and/or thin. Hence, a configuration that can detect a press due to a user operation even in a restricted space is extremely useful.

Furthermore, the electronic device 1 according to the present embodiment provides a tactile sensation by displacing the entire panel 40 in the transverse direction (X-axis direction) relative to the interface surface α. In general, if the panel that provides a tactile sensation is a thick member in the Z-axis direction, then the tactile sensation provided by installing an actuator at the back (back surface side) of the panel is not easily conveyed to the interface surface. The electronic device 1 according to the present embodiment can provide a good tactile sensation even if the panel 40 is, for example, a thick member in the Z-axis direction.

Second Embodiment

Next, an electronic device according to a second embodiment of the present disclosure is described.

Figure 8:
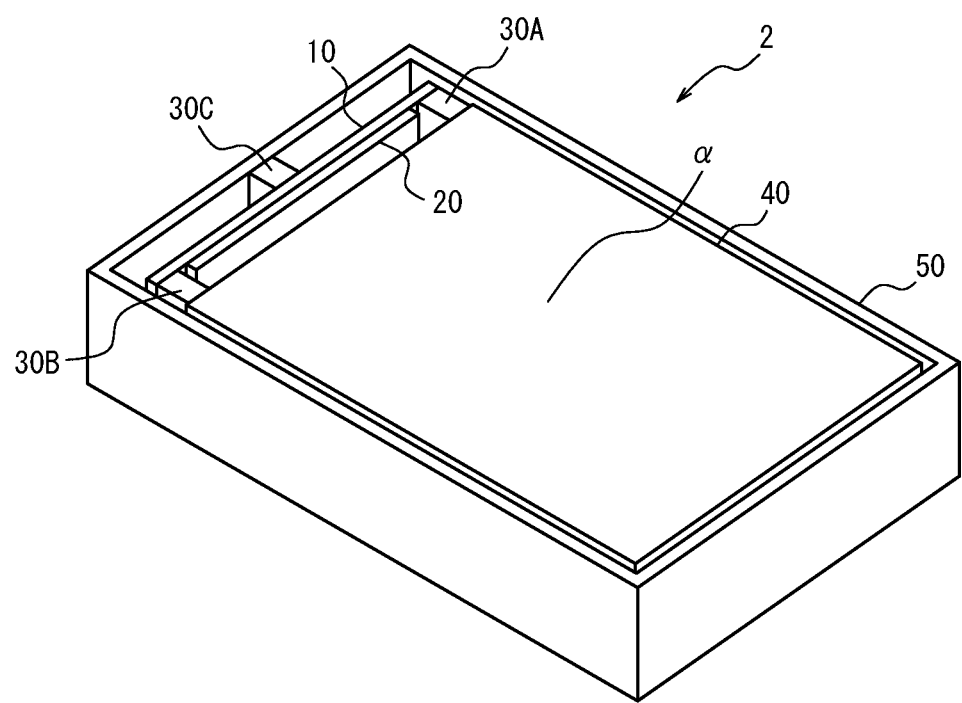
FIG. 8 is a perspective view illustrating the appearance of an electronic device according to a second embodiment of the present disclosure.

FIG. 8 is a perspective view illustrating the appearance of an electronic device according to the second embodiment of the present disclosure. FIGS. 9A and 9B are enlarged views of the top surface of the electronic device 1 according to the second embodiment, i.e. enlargements of the electronic device according to the second embodiment in FIG. 8 as viewed in the negative direction along the Z-axis. FIG. 9A illustrates the state before the electronic device according to the second embodiment detects a press. FIG. 9B illustrates the state while the electronic device according to the second embodiment is detecting a press.

As illustrated in FIG. 8 and FIGS. 9A and 9B, an electronic device 2 according to the second embodiment adopts a different form of connecting the press detector 25 (10, 20) to the panel 40 and the base 50 than does the above-described electronic device 1 according to the first embodiment. Other than this change to the form of connection, the electronic device 2 according to the second embodiment can have the same configuration as the above-described electronic device 1 according to the first embodiment. Hence, a description of matter that is the same as in the electronic device 1 according to the first embodiment is simplified or omitted as appropriate.

As illustrated in FIG. 8 and FIGS. 9A and 9B, the connecting portions 30A and 30B in the electronic device 2 according to the second embodiment connect the press detector 25 (10, 20) to the panel 40. Furthermore, the connecting portion 30C connects the press detector 25 (10, 20) to the base 50.

The panel 40 is not displaced while in the state illustrated in FIG. 9A, in which the interface surface α is not being pressed. Hence, as illustrated in FIG. 9A, the press detector 25 (10, 20) is not bent in this state. Consequently, the piezoelectric element 20 of the press detector 25 does not generate voltage in the state illustrated in FIG. 9A. The electronic device 2 therefore detects the press on the interface surface α as being zero.

On the other hand, the panel 40 is displaced while in the state illustrated in FIG. 9B, in which the interface α is being pressed. Hence, as illustrated in FIG. 9B, the press detector 25 (10, 20) is bent in this state. Consequently, the piezoelectric element 20 of the press detector 25 generates voltage in the state illustrated in FIG. 9B. The electronic device 2 therefore detects the press on the interface surface α.

With this type of configuration as well, the electronic device 2 according to the second embodiment can detect a press with the press detector 25 (10, 20), like the electronic device 1 according to the first embodiment. Furthermore, the electronic device 2 according to the second embodiment can also provide a tactile sensation with the press detector 25 (10, 20), like the electronic device 1 according to the first embodiment.

Other embodiments of the present disclosure are described below. Like the electronic device 2 according to the second embodiment, a description of matter that is the same as in the electronic device 1 according to the first embodiment is simplified or omitted as appropriate.

Third Embodiment

Figure 10A:
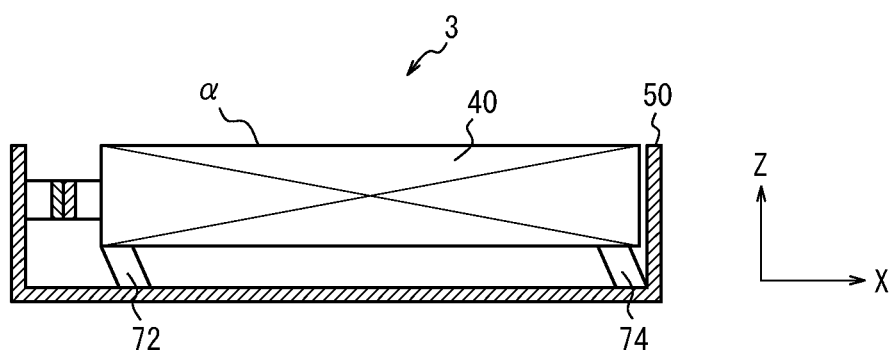
FIGS. 10A and 10B illustrate operations of an electronic device according to a third embodiment of the present disclosure.
Figure 10B:
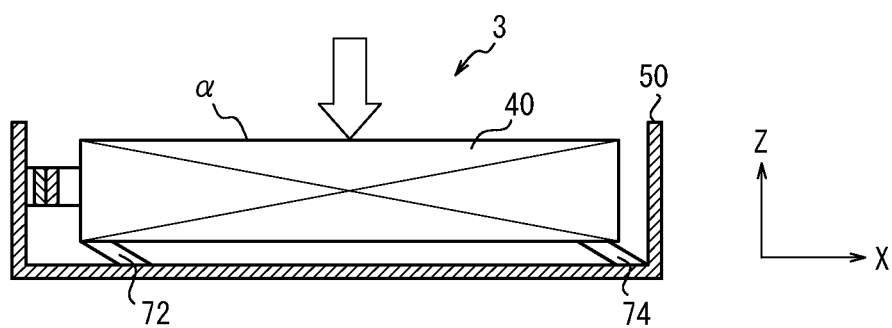

FIGS. 10A and 10B illustrate operations of an electronic device according to a third embodiment of the present disclosure. FIG. 10A illustrates the state before detecting a press, and FIG. 10B illustrates the state while detecting a press.

As illustrated in FIGS. 10A and 10B, the electronic device 3 according to the third embodiment does not need to include the inclined portions 52, 54 in the base 50 or the inclined portions 42, 44 in the panel 40, unlike the electronic devices 1, 2 according to the first and second embodiments. The electronic device 3 according to the third embodiment includes elastic members 72, 74 interposed between the panel 40 and the base 50, as illustrated in FIGS. 10A and 10B. Furthermore, in the electronic device 3 according to the third embodiment, the elastic members 72, 74 can be arranged between the panel 40 and the base 50 in an inclined state relative to the press direction (Z-axis direction) of the panel 40. FIG. 10A illustrates the state before the electronic device 3 detects a press. In this state, the elastic members 72, 74 are arranged to be slightly inclined (in the positive direction along the X-axis) from the press direction (Z-axis direction) of the panel 40. Such elastic members 72, 74 can, for example, be made of silicone rubber or the like, be formed in advance by deforming a cuboid to be slanted, and be installed near the four corners at the back (back surface side) of the panel 40.

By being arranged in an inclined state, as illustrated in FIG. 10A, the elastic members 72, 74 displace the panel 40 in the negative direction along the X-axis, as illustrated in FIG. 10B, upon the interface surface α being pressed to displace the panel 40 in the negative direction along the Z-axis. The press detector 25 (10, 20) can therefore detect a press on the interface surface α on the basis of such displacement in the negative direction along the X-axis.

In this way, the elastic members 72, 74 of the electronic device 3 according to the third embodiment are configured to deform in accordance with a press on the interface surface α. Consequently, the panel 40 of the electronic device 3 according to the third embodiment is configured to be displaced with a displacement component in the press direction of the panel 40 and also a displacement component in a direction orthogonal to the press direction. The same effects as those of the electronic devices 1, 2 according to the above-described first and second embodiments can be obtained with this configuration as well.

Fourth Embodiment

Figure 11A:
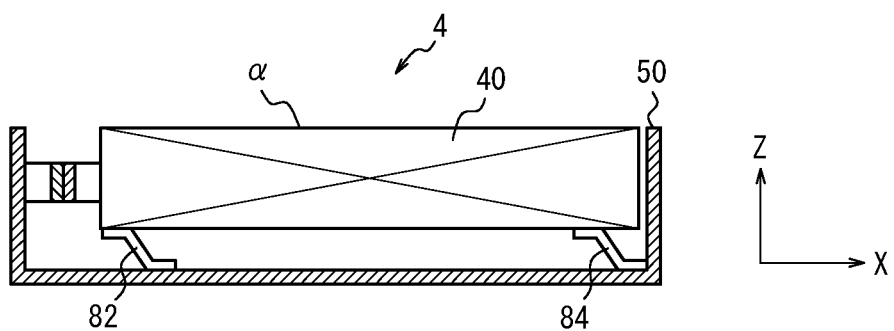
FIGS. 11A and 11B illustrate operations of an electronic device according to a fourth embodiment of the present disclosure.
Figure 11B:
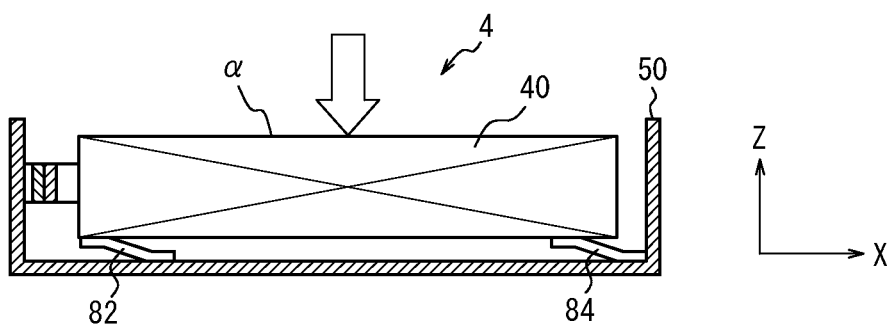

FIGS. 11A and 11B illustrate operations of an electronic device according to a fourth embodiment of the present disclosure. FIG. 11A illustrates the state before detecting a press, and FIG. 11B illustrates the state while detecting a press.

As illustrated in FIGS. 11A and 11B, an electronic device 4 according to the fourth embodiment has the configuration of the electronic device 3 according to the third embodiment as described in FIG. 10A and FIG. 10B, except that the elastic members 72, 74 are changed to elastic members 82, 84. The elastic members 72, 74 of the electronic device 3 according to the third embodiment are made of rubber or the like and are formed in advance by deforming a cuboid to be slanted. The elastic members 82, 84 in the electronic device 4 according to the fourth embodiment have portions that are inclined in advance, as illustrated in FIG. 11A. The elastic members 82, 84 can be constituted by members such as leaf springs. The elastic members 82, 84 can be any members with appropriate elasticity, such as a thin metal plate, or silicone rubber in the shape of a thin plate.

By including an inclined portion, as illustrated in FIG. 11A, the elastic members 82, 84 displace the panel 40 in the negative direction along the X-axis, as illustrated in FIG. 11B, upon the interface surface α being pressed to displace the panel 40 in the negative direction along the Z-axis. The press detector 25 (10, 20) can therefore detect a press on the interface surface α on the basis of such displacement in the negative direction along the X-axis. The same effects as those of the electronic devices according to the above-described embodiments can be obtained with this configuration as well.

Fifth Embodiment

Figure 12A:
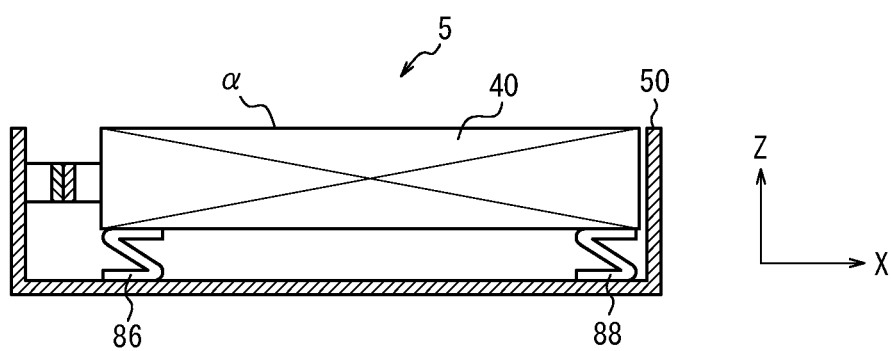
FIGS. 12A and 12B illustrate operations of an electronic device according to a fifth embodiment of the present disclosure.
Figure 12B:
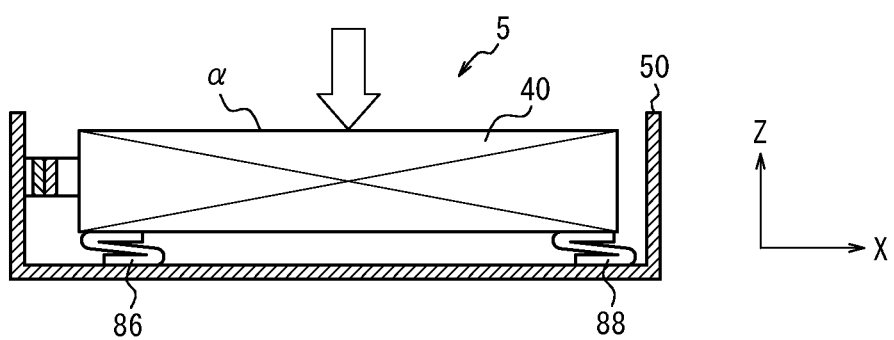

FIGS. 12A and 12B illustrate operations of an electronic device according to a fifth embodiment of the present disclosure. FIG. 12A illustrates the state before detecting a press, and FIG. 12B illustrates the state while detecting a press.

As illustrated in FIGS. 12A and 12B, an electronic device 5 according to the fifth embodiment has the configuration of the electronic device 4 according to the fourth embodiment as described in FIG. 11A and FIG. 11B, except that the elastic members 82, 84 are changed to elastic members 86, 88. Like the elastic members 82, 84, the elastic members 86, 88 can be any members, such as leaf springs, and can be made of a material similar to that of the elastic members 82, 84. The same effects as those of the electronic devices according to the above-described embodiments can be obtained with this configuration as well.

Sixth Embodiment

Figure 13A:
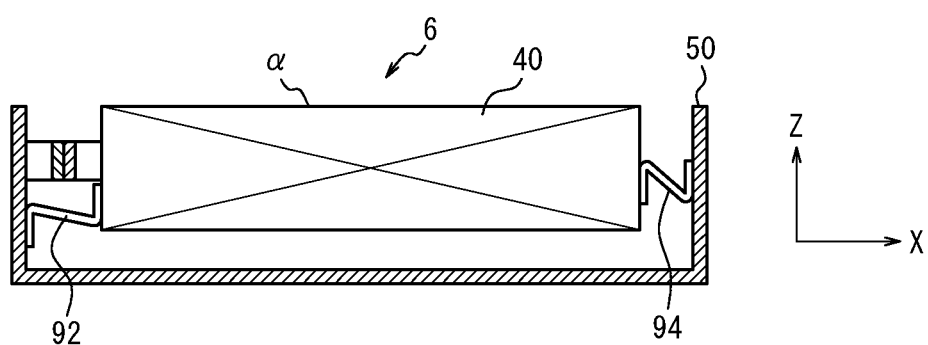
FIGS. 13A and 13B illustrate operations of an electronic device according to a sixth embodiment of the present disclosure.
Figure 13B:
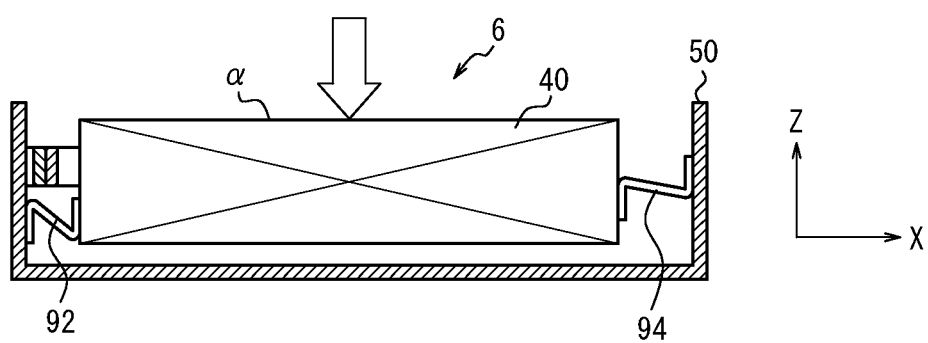

FIGS. 13A and 13B illustrate operations of an electronic device according to a sixth embodiment of the present disclosure. FIG. 13A illustrates the state before detecting a press, and FIG. 13B illustrates the state while detecting a press.

As illustrated in FIGS. 13A and 13B, an electronic device 6 according to the sixth embodiment has the configuration of the electronic device 5 according to the fifth embodiment as described in FIG. 12A and FIG. 12B, except that the elastic members 86, 88 are changed to elastic members 92, 94. The elastic members 92, 94 can have a shape similar to that of the elastic members 86, 88 but differ in the positions of attachment between the panel 40 and the base 50. As illustrated in FIGS. 13A and 13B, the elastic members 92, 94 in the electronic device 6 according to the sixth embodiment are configured to be interposed between the side of the panel 40 and the inner side of the base 50.

With this configuration, the elastic members 92, 94 displace the panel 40 in the negative direction along the X-axis, as illustrated in FIG. 13B, upon the interface surface α being pressed to displace the panel 40 in the negative direction along the Z-axis in the state illustrated in FIG. 13A. Consequently, the same effects as those of the electronic devices according to the above-described embodiments can be obtained with the electronic device 6 according to the sixth embodiment as well.

Seventh Embodiment

Figure 14A:
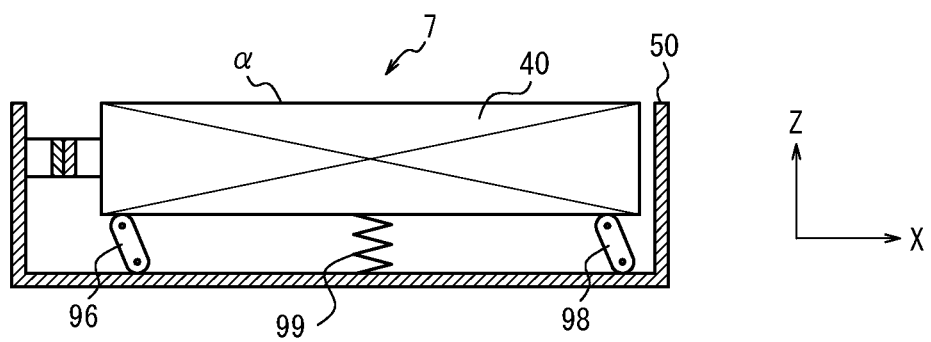
FIGS. 14A and 14B illustrate operations of an electronic device according to a seventh embodiment of the present disclosure.
Figure 14B:
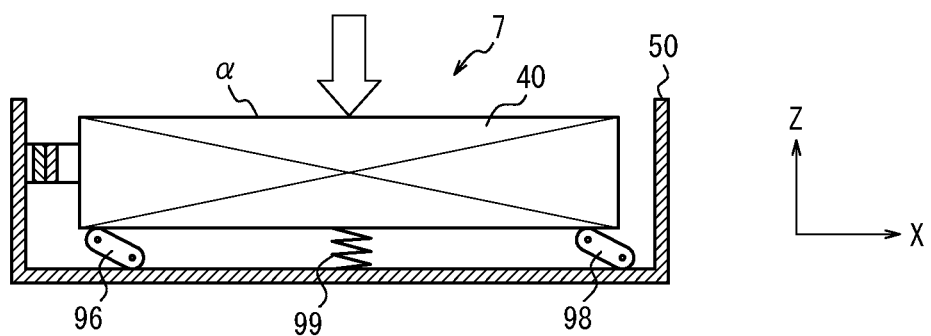

FIGS. 14A and 14B illustrate operations of an electronic device according to a seventh embodiment of the present disclosure. FIG. 14A illustrates the state before detecting a press, and FIG. 14B illustrates the state while detecting a press.

The electronic device 4 according to the fourth embodiment described in FIGS. 11A and 11B displaces the panel 40 in the negative direction along the X-axis by the effect of the elastic members 82, 84, such as leaf springs having a portion inclined in advance, and also uses the elastic force of the elastic members 82, 84. In an electronic device 7 according to the seventh embodiment, separate members carry out the function to displace the panel 40 in the negative direction along the X-axis and the function to provide elastic force, as illustrated in FIGS. 14A and 14B.

As illustrated in FIGS. 14A and 14B, the electronic device 7 according to the seventh embodiment includes connectors 96, 98 that connect the panel 40 and the base 50 instead of including the elastic members 82, 84 of the electronic device 4 according to the fourth embodiment. Rather than being constituted by elastic members, the connectors 96, 98 can be constituted by any members that have appropriate rigidity, such as plastic or metal. The connectors 96, 98 have mechanisms that are movable relative to the panel 40 and to the base 50. With this mechanism, the connectors 96, 98 also displace the panel 40 in the negative direction along the X-axis, as illustrated in FIG. 14B, upon the interface surface α being pressed to displace the panel 40 in the negative direction along the Z-axis in the state illustrated in FIG. 14A. The press detector 25 (10, 20) can therefore detect a press on the interface surface α on the basis of such displacement in the negative direction along the X-axis.

To restore the panel 40 that was displaced in the negative direction along the Z-axis and the negative direction along the X-axis by a press on the interface surface α, the electronic device 7 according to the seventh embodiment may include a separate elastic member, such as a spring 99.

The electronic device 7 according to the seventh embodiment thus includes the connectors 96, 98 that connect the panel 40 and the base 50. Here, by the position of the panel 40 relative to the base 50 changing via the connectors 96, 98 in accordance with a press on the interface surface α, the panel 40 is displaced with a displacement component in the press direction of the panel 40 and also a displacement component in a direction orthogonal to the press direction. The same effects as those of the electronic devices according to the above-described embodiments can be obtained with this configuration as well.

Eighth Embodiment

Figure 15A:
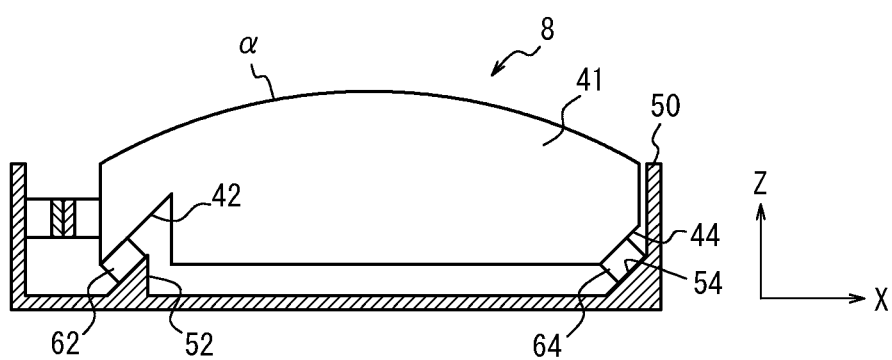
FIGS. 15A and 15B illustrate operations of an electronic device according to an eighth embodiment of the present disclosure.
Figure 15B:
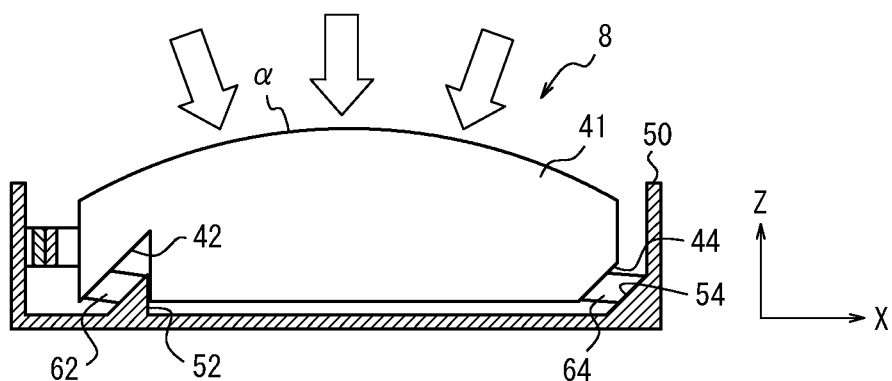

FIGS. 15A and 15B illustrate operations of an electronic device according to an eighth embodiment of the present disclosure. FIG. 15A illustrates the state before detecting a press, and FIG. 15B illustrates the state while detecting a press.

In an electronic device 8 according to the eighth embodiment, the panel 40 of the electronic devices 1, 2, according to the first and second embodiments is changed to a panel 41, as illustrated in FIGS. 15A and 15B. In the panel 41 of the electronic device 8 according to the eighth embodiment, a portion of the interface surface α is curved like a sphere, as illustrated in FIGS. 15A and 15B. In this way, the electronic device 8 according to the eighth embodiment is configured so that at least a portion of the interface surface α of the panel 41 is a curved surface. The same effects as those of the electronic devices according to the above-described embodiments can be obtained with this configuration as well.

In general, a tactile sensation could be provided on an interface surface α shaped like the panel 41 in FIGS. 15A and 15B by making the panel 41 hollow and attempting to adhere an actuator from the back of the interface surface α, for example, but such a curved surface is often not suitable for attachment of an actuator. As described above, the electronic device 1 according to the present embodiment provides a tactile sensation by displacing the entire panel 40 in the transverse direction (X-axis direction) relative to the interface surface α. Consequently, even if the panel 40 has a curved shape like the panel 41, a good tactile sensation can be provided without attaching an actuator to such a curved surface.

Furthermore, with the electronic device 8 according to the eighth embodiment, the direction of a press on the interface surface α is not limited to being parallel to the Z-axis. A press in a direction not parallel to the Z-axis can also be detected, as illustrated in FIG. 15B. For example, a press can be calculated on the basis of the absolute value of the voltage generated by the piezoelectric element 20 of the press detector 25 even when the panel 41 is displaced in the positive direction along the X-axis as a result of a press on the interface surface α.

Although the present disclosure has been described with reference to the accompanying drawings and examples, it is to be noted that various changes and modifications will be apparent to those skilled in the art based on the present disclosure. Therefore, such changes and modifications are to be understood as included within the scope of the present disclosure. For example, the functions and the like included in the various functional components, means, and steps may be reordered in any logically consistent way. Furthermore, functional components or steps may be combined into one or divided. The above embodiments of the present disclosure are not limited to being implemented precisely as described and may be implemented by combining or partially omitting the features thereof.

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, an RFID receiver, a game device, an electronic notepad, a laptop computer, a global positioning system (GPS) receiver, and other programmable data processing apparatuses. It should be noted that in each embodiment, various operations are executed by a dedicated circuit (for example, individual logical gates interconnected in order to execute a particular function) implementing program instructions (software), or by a logical block, program module, or the like executed by one or more processors. The one or more processors that execute a logical block, program module, or the like include, for example, one or more of a microprocessor, CPU, application specific integrated circuit (ASIC), digital signal processor (DSP), programmable logic device (PLD), field programmable gate array (FPGA), processor, controller, microcontroller, microprocessor, electronic device, other apparatus designed to be capable of executing the functions disclosed here, and/or a combination of any of the above. The embodiments disclosed herein are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment transmits and/or receives information, data arguments, variables, or memory content to or from another code segment or hardware circuit and thereby connects to the other code segment or hardware circuit.

When using a network, the network may be the Internet, an ad hoc network, a local area network (LAN), a wide area network (WAN), a metropolitan area network (MAN), a cellular network, a wireless wide area network (WWAN), a wireless personal area network (WPAN), a public switched telephone network (PSTN), a terrestrial wireless network, another network, or a combination of any of these, unless otherwise indicated. A wireless network includes constituent elements such as an access point (e.g. a Wi-Fi access point) and a femtocell, for example. Furthermore, a wireless communication device can connect to a wireless network that uses Wi-Fi, Bluetooth® (Bluetooth is a registered trademark in Japan, other countries, or both), cellular communication technology (such as code division multiple access (CDMA), time division multiple access (TDMA), frequency division multiple access (FDMA), orthogonal frequency division multiple access (OFDMA), or single-carrier frequency division multiple access (SC-FDMA)), or other wireless techniques and/or technical standards. One or more techniques may be adopted for the networks. Such techniques include, for example, universal mobile telecommunications system (UTMS), long term evolution (LTE), evolution-data optimized or evolution-data only (EV-DO), global system for mobile communications (GSM®) (GSM is a registered trademark in Japan, other countries, or both), worldwide interoperability for microwave access (WIMAX), code division multiple access-2000 (CDMA-2000), or time division synchronous code division multiple access (TD-SCDMA).

The machine-readable, non-transitory storage medium may also be constituted by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic and optical storage media (such as a compact disc (CD), laser Disc® (laser disc is a registered trademark in Japan, other countries, or both), digital versatile disc (DVD), floppy disk, and Blu-ray Disc), portable computer disk, random access memory (RAM), read-only memory (ROM), rewritable programmable ROM such as EPROM, EEPROM, or flash memory, another tangible storage medium that can store information, or a combination of any of these. The memory 200 may be provided internal and/or external to a processor or processing unit. As used in this disclosure, the term "memory" refers to all types of long-term storage, short-term storage, volatile, non-volatile, or other memory. No limitation is placed on the particular type or number of memories, or on the type of medium for memory storage.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described here. The various functions of different constituent elements may be combined with or separated from hardware and/or software in any way, and each may be used individually or in some combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms, and all such embodiments are included in the scope of the subject matter in the present disclosure.

REFERENCE SIGNS LIST 1, 2, 3, 4, 5, 6, 7, 8 Electronic device
10 Plate member
20 Piezoelectric element
25 Press detector
30 Connecting portion
40, 41 Panel
50 Base
62, 64 Elastic member
72, 74 Elastic member
82, 84, 86, 88 Elastic member
92, 94 Elastic member
96, 98 Connector
99 Spring
100 Controller
200 Memory
300 Touch sensor
400 Display

The invention claimed is:

1. An electronic device comprising:
a panel; and
a press detector configured to detect a press,
wherein, when the panel is pressed in a first direction orthogonal to the panel, the press detector detects the press in a second direction orthogonal to the first direction, and
the panel is configured to be displaced with a displacement component in the press direction and also a displacement component in a direction orthogonal to the press direction in accordance with a press on an interface surface of the panel.

2. The electronic device of claim 1, wherein the press detector detects the press on the basis of a force in the direction orthogonal to the press direction.

3. The electronic device of claim 1, further comprising:
a base supporting the panel; wherein
the base is structured so that at least a part of a portion supporting the panel has an inclination; and
the panel is displaced along the inclination in accordance with the press on the interface surface.

4. The electronic device of claim 3, further comprising:
an elastic member interposed between the panel and the base; wherein
the panel is displaced along the inclination by deformation of the elastic member in accordance with the press on the interface surface.

5. The electronic device of claim 1, further comprising:
a base supporting the panel; and
an elastic member interposed between the panel and the base; wherein
the panel is displaced with the displacement component in the press direction and also the displacement component in the direction orthogonal to the press direction by deformation of the elastic member in accordance with the press on the interface surface.

6. The electronic device of claim 5, wherein the elastic member is disposed between the panel and the base in an inclined state relative to the press direction of the panel.

7. The electronic device of claim 5, wherein the elastic member is interposed between a side of the panel and a side of the base.

8. The electronic device of claim 1, further comprising:
a base supporting the panel; and
a connector connecting the panel and the base; wherein
the panel is displaced with the displacement component in the press direction and also the displacement component in the direction orthogonal to the press direction by a position of the panel relative to the base changing via the connector in accordance with the press on the interface surface.

9. The electronic device of claim 1, wherein at least a portion of an interface surface of the panel is a curved surface.

10. The electronic device of claim 1, wherein the press detector is driven as an actuator that displaces the panel in a transverse direction relative to an interface surface of the panel.

11. The electronic device of claim 10, wherein the press detector displaces the panel in the transverse direction relative to the interface surface to provide a tactile sensation on the interface surface in accordance with the press detected by the press detector.

12. An electronic device comprising:
a panel; and
a press detector configured to detect a press, wherein
the press detector detects a force resulting from the press, the force being in a direction different from a press direction of the panel, and
the panel is configured to be displaced with a displacement component in the press direction and also a displacement component in a direction orthogonal to the press direction in accordance with a press on an interface surface of the panel.

* * * * *